(12) United States Patent
Wang

(10) Patent No.: US 8,901,879 B2
(45) Date of Patent: Dec. 2, 2014

(54) MOBILE ELECTRONIC DEVICE STORAGE AND CHARGING SYSTEM

(75) Inventor: Jung-Kun Wang, Taoyuan County (TW)

(73) Assignee: Chen-Source Inc., Taoyuan County (TW)

( * ) Notice: Subject to any disclaimer, the term of this patent is extended or adjusted under 35 U.S.C. 154(b) by 477 days.

(21) Appl. No.: 13/444,024

(22) Filed: Apr. 11, 2012

(65) Prior Publication Data

US 2013/0271081 A1 Oct. 17, 2013

(51) Int. Cl.
*H02J 7/00* (2006.01)
(52) U.S. Cl.
USPC .......................................................... 320/107
(58) Field of Classification Search
USPC .......................................................... 320/107
See application file for complete search history.

(56) References Cited

U.S. PATENT DOCUMENTS

| | | | | |
|---|---|---|---|---|
| 8,026,698 | B2* | 9/2011 | Scheucher | 320/136 |
| 2009/0096336 | A1* | 4/2009 | Petrick et al. | 312/237 |
| 2010/0231161 | A1* | 9/2010 | Brown | 320/101 |
| 2011/0036747 | A1* | 2/2011 | Petrick et al. | 206/701 |

* cited by examiner

*Primary Examiner* — Samuel Berhanu
(74) *Attorney, Agent, or Firm* — Bacon & Thomas, PLLC

(57) ABSTRACT

A mobile electronic device storage and charging system includes a housing for accommodating mobile electronic devices, which includes a wheeled hollow base frame shell equipped with a retractable handle and carrying handles, a cover shell for covering the wheeled hollow base frame shell, and two sliding rail assemblies hinged between the hollow base frame shell and the cover shell at different elevations for enabling the cover shell to be opened from the wheeled hollow base frame shell through 90° angle and then moved to one lateral side relative to the wheeled hollow base frame shell, a transmission control system, which includes a power management unit and a connector module controllable to charge mobile electronic devices and to link mobile electronic devices to the internet, and a power cable for electrically connecting the power management unit to an external power source for power input.

8 Claims, 8 Drawing Sheets

MOBILE ELECTRONIC DEVICE STORAGE AND CHARGING SYSTEM

BACKGROUND OF THE INVENTION

1. Field of the Invention

The present invention relates to mobile electronic device storage and charging technology and more particularly, to a mobile electronic device storage and charging system, which uses specially designed sliding rail assemblies to couple a cover shell and a wheeled hollow base frame shell, so that the cover shell can be opened from the wheeled hollow base frame shell through 90° angle and then moved to one lateral side relative to the wheeled hollow base frame shell, facilitating access to an organizer in the wheeled hollow base frame shell for the storage of mobile electronic devices in the organizer or removal of storage mobile electronic devices from the organizer conveniently.

2. Description of the Related Art

Following fast development of electronic technology and multimedia information technology, mobile electronic devices with light, thin, short and small characteristics, including ultra-thin notebooks, tablet computers, smart phones, PDAs and etc., have been continuously created to serve people for different purposes.

For making an ultra-thin notebook computer, the related electronic components must have a high precision. Further, to avoid notebook computer damage during delivery, a protective case may be used. A protective case for notebook computer is known, comprising a bottom cover shell defining therein an accommodation chamber, a rack pivotally mounted in the accommodation chamber and turnable in and out of the accommodation chamber for supporting a notebook computer, and a top cover shell hinged to the bottom cover shell for closing the bottom cover shell. As this design of protective case is adapted for holding one single notebook computer, it is not suitable for use in a school, organization or company for the storage or management of a large number of notebook computers. In a school, organization or company where multiple notebook computers are prepared, the notebook computers may be directly kept on desks in a room. It is inconvenient to manage a large number of notebook computers in this manner. Further, the notebook computers may be stolen easily if they are directly kept on desks in a room.

Further, the use of a protective case for notebook computer facilitates the delivery of the notebook computer. However, when opening the protective case in vertical, the storage notebook computer may fall to the ground accidentally. Further, the storage notebook computer may be damaged during delivery if the protective case is heavily vibrated. Further, notebook computer protective cases or storage means do not provide an integrated battery charging function. A separate battery charger or power management system must be used and connected to an external power source for charging the storage notebook computer(s) for application if the power of the storage notebook computer(s) is low.

SUMMARY OF THE INVENTION

The present invention has been accomplished under the circumstances in view. It is one object of the present invention to provide a mobile electronic device storage and charging system, which comprises a housing for accommodating mobile electronic devices, a transmission control system for charging storage mobile electronic devices and linking mobile electronic devices to the internet for downloading software and upgrading existing software, and a power cable for electrically connecting the transmission control system to an external power source for AC power input, wherein the housing comprises a wheeled hollow base frame shell equipped with a retractable handle and carrying handles, a cover shell for covering the wheeled hollow base frame shell, and two sliding rail assemblies hinged between the hollow base frame shell and the cover shell at different elevations for enabling the cover shell to be opened from the wheeled hollow base frame shell through 90° angle and then moved to one lateral side relative to the wheeled hollow base frame shell.

Further, the housing comprises a rack mounted in the wheeled hollow base frame shell, and an organizer mounted in the rack for accommodating mobile electronic devices. The rack comprises a bottom panel, two upright side panels bilaterally upwardly extended from the bottom panel, a top panel connected between top ends of the upright side panels, a back panel, and a holder chamber surrounded by the bottom panel, the upright side panels, the top panel and the back panel for accommodating the organizer.

Further, the organizer is made of a shock-absorbing material (foam plastics, rubber, etc.) capable of protecting storage mobile electronic devices from shocks. Further, the organizer comprises a plurality of transverse accommodation slots arranged at different elevations for accommodating mobile electronic devices, and a plurality of wire grooves arranged at different elevations corresponding to the transverse accommodation slots for keeping cables.

Further, the connector module comprises a plurality of USB female connectors electrically connectable to storage mobile electronic devices in the transverse accommodation slots of the organizer by respective transmission cables for the transmission of power supply and data signals.

Further, the power management unit of the transmission control system comprises an expansion connector module electrically connected to the power management unit and the connector module. The expansion connector module comprises at least one signal connector electrically connectable to an external electronic device for power output to the external electronic device as well as for data signal transmission between the external electronic device and the mobile electronic devices being stored in the organizer, and at least one expansion power socket for power output.

DETAILED DESCRIPTION OF THE PREFERRED EMBODIMENT

Figure 1:
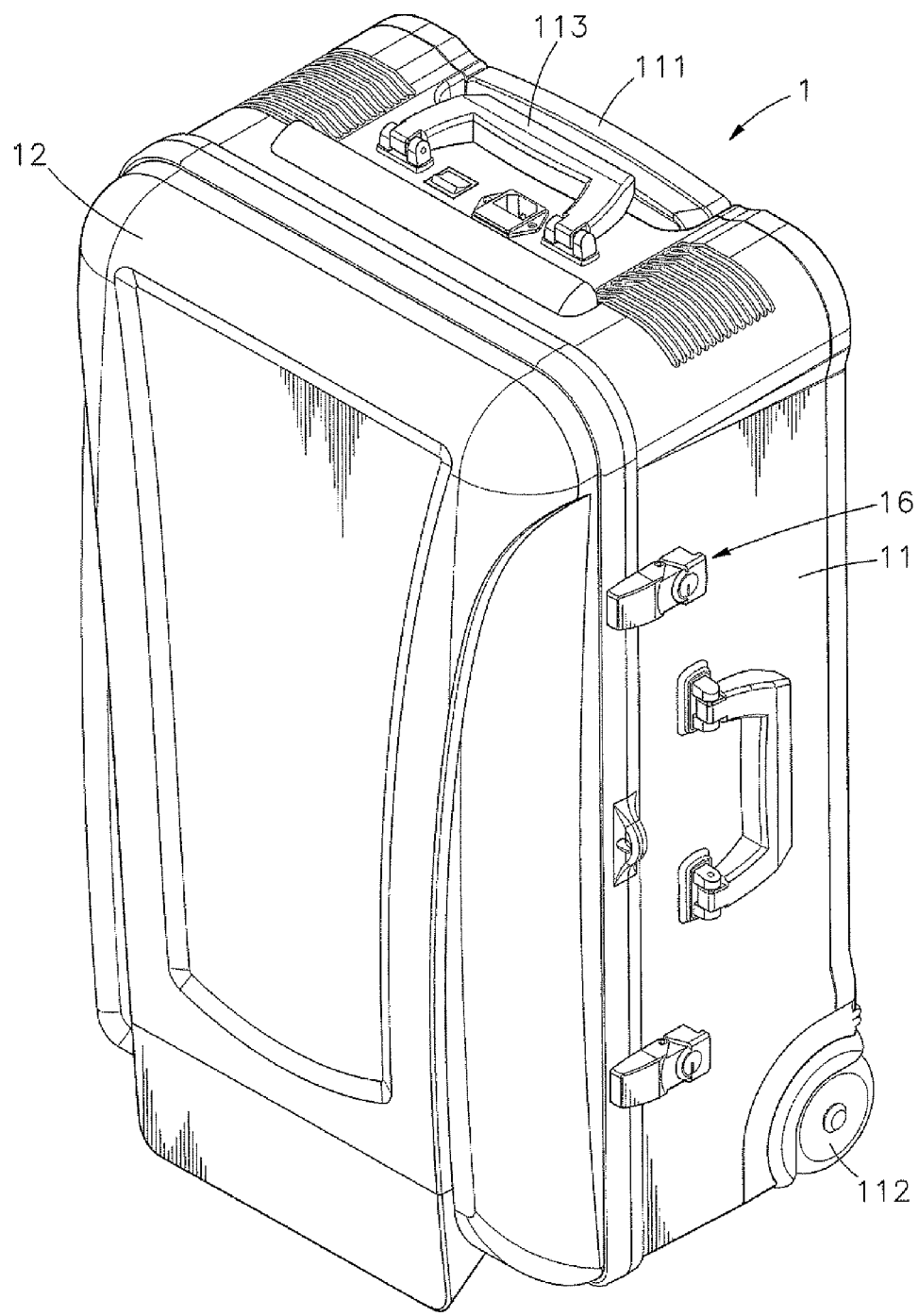
FIG. 1 is an elevational view of a mobile electronic device storage and charging system in accordance with the present invention.
Figure 2:
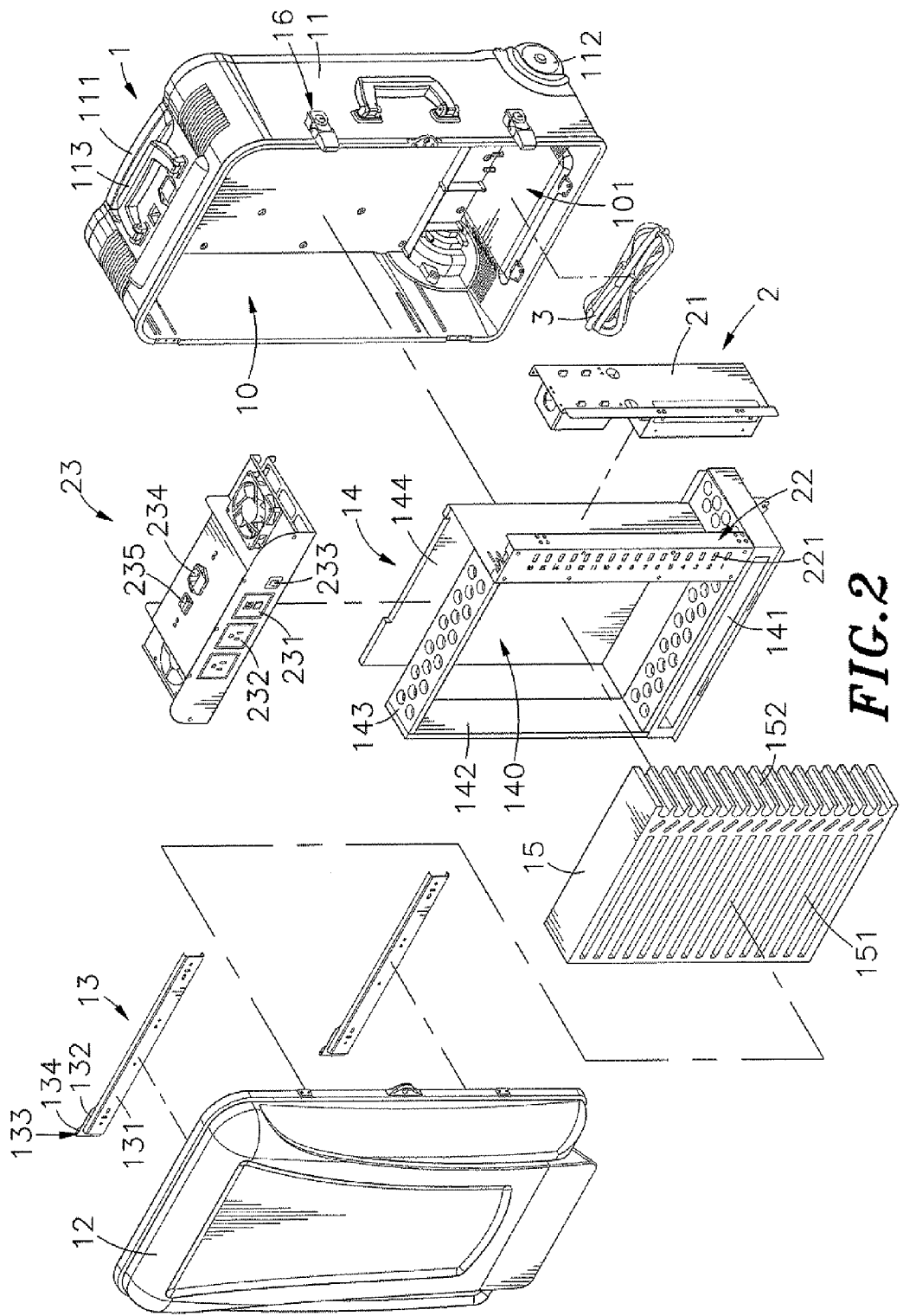
FIG. 2 is an exploded view of the mobile electronic device storage and charging system in accordance with the present invention.
Figure 3:
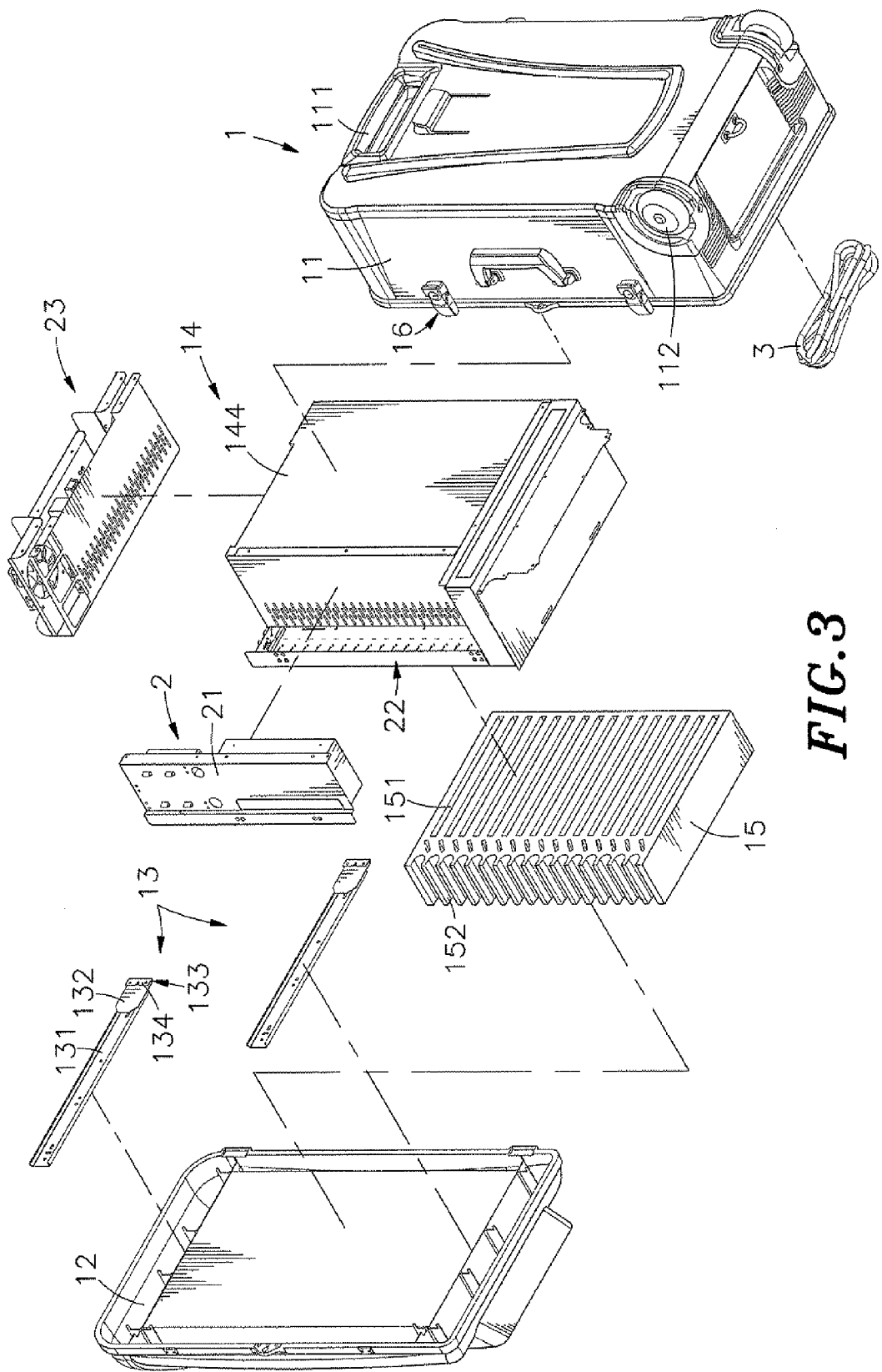
FIG. 3 corresponds to FIG. 2 when viewed from another angle.
Figure 4:
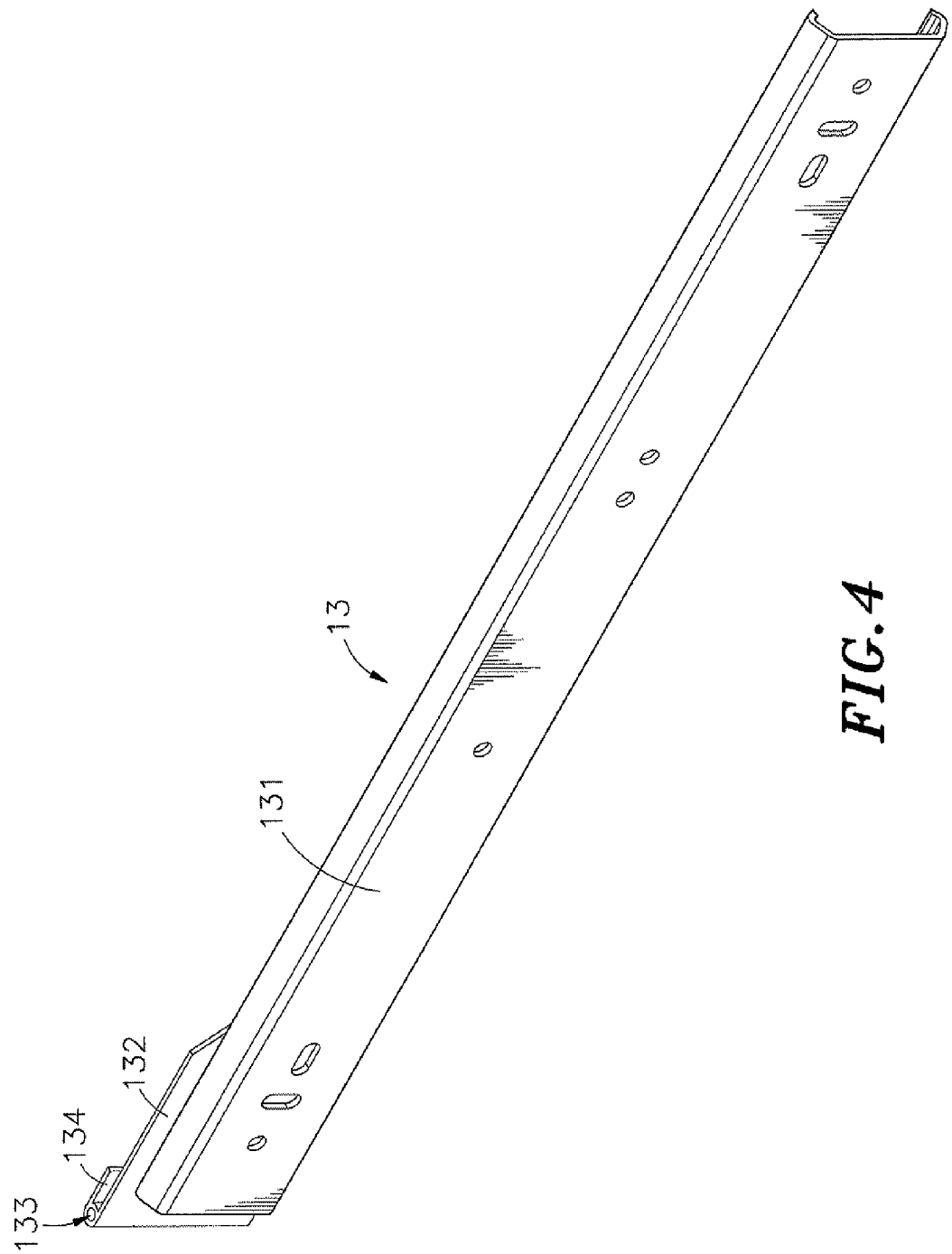
FIG. 4 is an elevational view of a sliding rail assembly for mobile electronic device storage and charging system in accordance with the present invention.

Referring to FIGS. 1-4, a mobile electronic device storage and charging system in accordance with the present invention is shown. The mobile electronic device storage and charging system comprises a housing 1, a transmission control system 2, and a power cable 3.

The housing 1 comprises a hollow base frame shell 11 defining therein a forward-facing accommodation chamber 10, a retractable handle 111 mounted at a back side of the hollow base frame shell 11, a plurality of swivel casters 112 pivotally connected to a bottom side of the hollow base frame shell 11, a plurality of carrying handles 113 respectively mounted at top and lateral sides of the hollow base frame shell 11, a cover shell 12 for covering the hollow base frame shell 11 to close the forward-facing accommodation chamber 10, two sliding rail assemblies 13 coupled between the hollow base frame shell 11 and the cover shell 12 near opposing top and bottom sides thereof and transversely arranged in parallel, a rack 14 mounted in the forward-facing accommodation chamber 10, an organizer 15 accommodated in the rack 14, and at least one, for example, two locks 16 for locking the cover shell 12 to the hollow base frame shell 11 in the close position. Each sliding rail assembly 13 comprises a first sliding rail 131 transversely affixed to an inner side of the cover shell 12, a second sliding rail 132 slidably coupled to the first sliding rail 131, and a hinge 133 formed integrally with the second sliding rail 132 (i.e., the second sliding rail 132 forms one leaf of the hinge 133) and having the other leaf 134 thereof affixed to one lateral side of the hollow base frame shell 11. The rack 14 comprises a bottom panel 141, two upright side panels 142 bilaterally upwardly extended from the bottom panel 141, a top panel 143 connected between top ends of the upright side panels 142, a back panel 144, and a holder chamber 140 surrounded by the bottom panel 141, the upright side panels 142, the top panel 143 and the back panel 144 for accommodating the organizer 15. The organizer 15 comprises a plurality of transverse accommodation slots 151 arranged at different elevations, and a plurality of wire grooves 152 arranged at different elevations corresponding to the transverse accommodation slots 151. Further, the bottom panel 141 and the top panel 143 are slotted, convenient for the insertion of electrical cables.

The transmission control system 2 comprises a power management unit 21, at least one, for example, one connector module 22 electrically connected to the power management unit 21, and an expansion connector module 23 electrically connected to the power management unit 21 and the connector module 22. The connector module 22 comprises a plurality of electrical sockets, for example, USB A type female connectors 221 for the transmission of power supply and data signals. The expansion connector module 23 comprises at least one signal connector 231 selected from the group of USB B type female connector, RJ145 female connector and audio female connector, at least one expansion power socket 232 for power output, a power switch 233 for switching on/off the at least one expansion power socket 232, a power input connector 234 for AC input, and a second power switch 235 for switching on/off the power input connector 234.

The power cable 3 is normally received in the storage space 101 inside the forward-facing accommodation chamber 10 of the housing 1 and kept under the rack 14, and adapted for electrically connecting the power input connector 234 of the expansion connector module 23 to an external AC power source.

When assembling the mobile electronic device storage and charging system, accommodate the transmission control system 2 in the accommodation chamber 10 inside the hollow base frame shell 11 of the housing 1 to have the power management unit 21 and the at least one connector module 22 be positioned on the outside wall of one upright side panel 142 of the rack 14, and then insert transmission cables (not shown) through the bottom panel 141 and/or top panel 143 of the rack 14 and electrically connect the respective USB A type male connectors at respective inner ends of the transmission cables to the USB A type female connectors 221 of the connector module 22. After connection to the USB A type female connectors 221 of the connector module 22, the transmission cables can be arranged in the wire grooves 152 of the organizer 15.

Thereafter, connect the electric plug (not shown) at one end of the power cable 3 to the power input connector 234 of the expansion connector module 23, and the electric plug (not shown) at the other end of the power cable 3 to an external AC power source 4 for AC power input. When switched on the second power switch 235, AC power supply is being transmitted to the power management unit 21, which converts the inputted AC power supply into one of different levels of DC voltages for output. When the user is going to move the housing 1 or after each use of the mobile electronic device storage and charging system, the user can unplug the two electric plugs of the power cable 3 and wind up the power cable 3, and then receive the power cable 3 in the storage space 101 inside the forward-facing accommodation chamber 10 under the rack 14, preventing the danger of stumbling.

Figure 5:
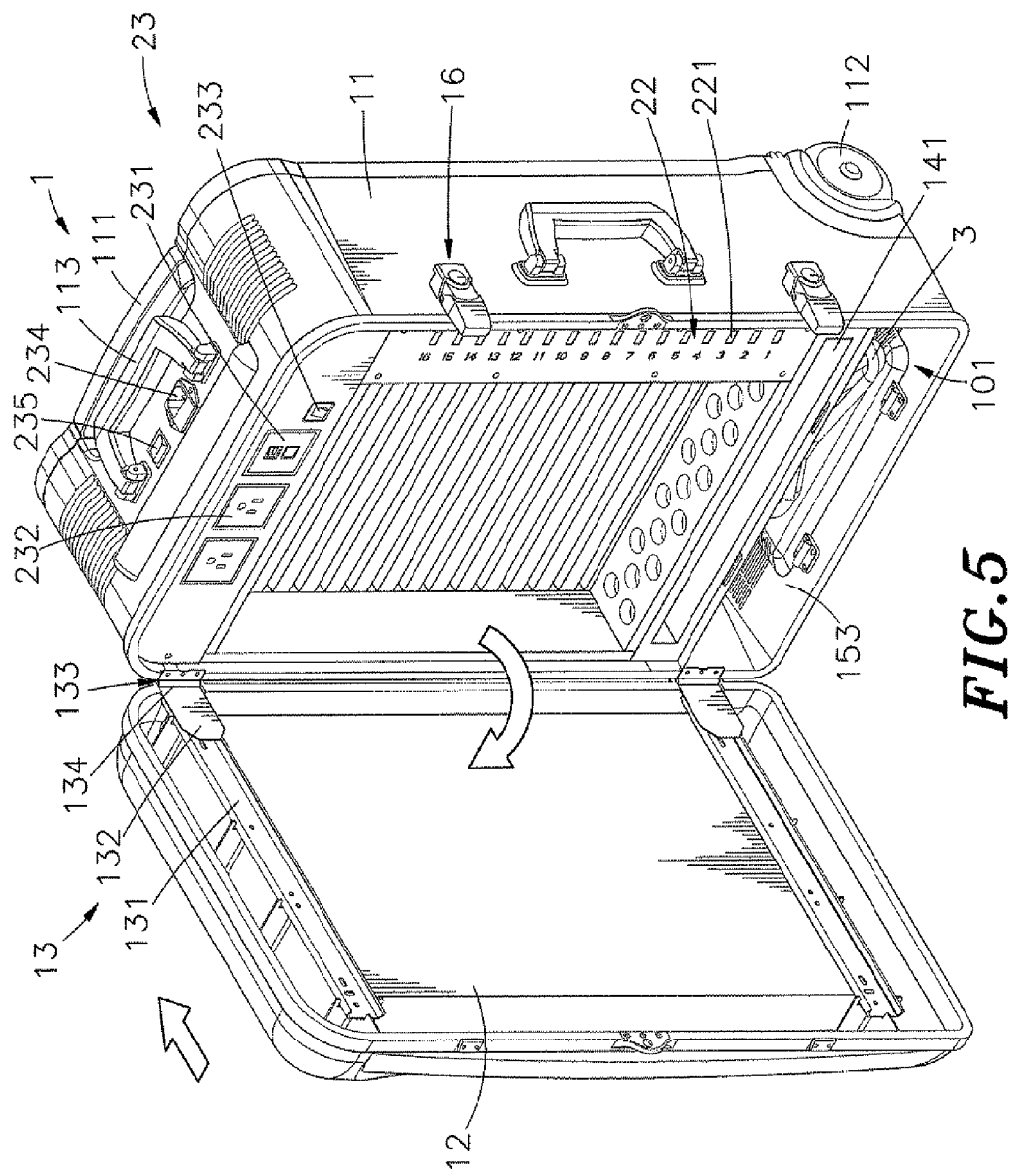
FIG. 5 is a schematic elevational view of the mobile electronic device storage and charging system in accordance with the present invention, illustrating the cover shell opened from the hollow base frame shell.
Figure 6:
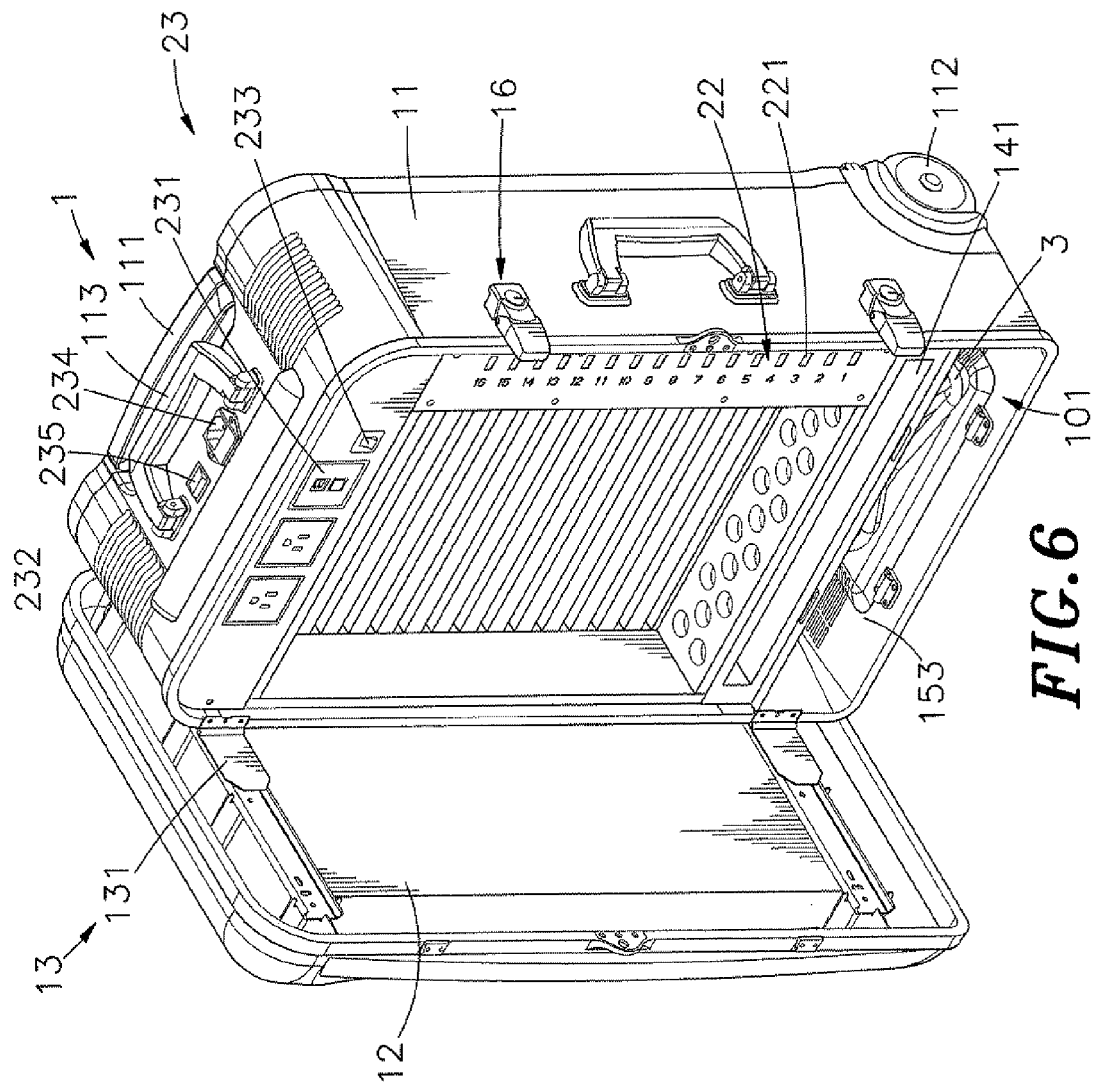
FIG. 6 corresponds to FIG. 5, illustrating the cover shell moved with the first sliding rail relative to the second sliding rail to one lateral side of the hollow base frame shell.
Figure 7:
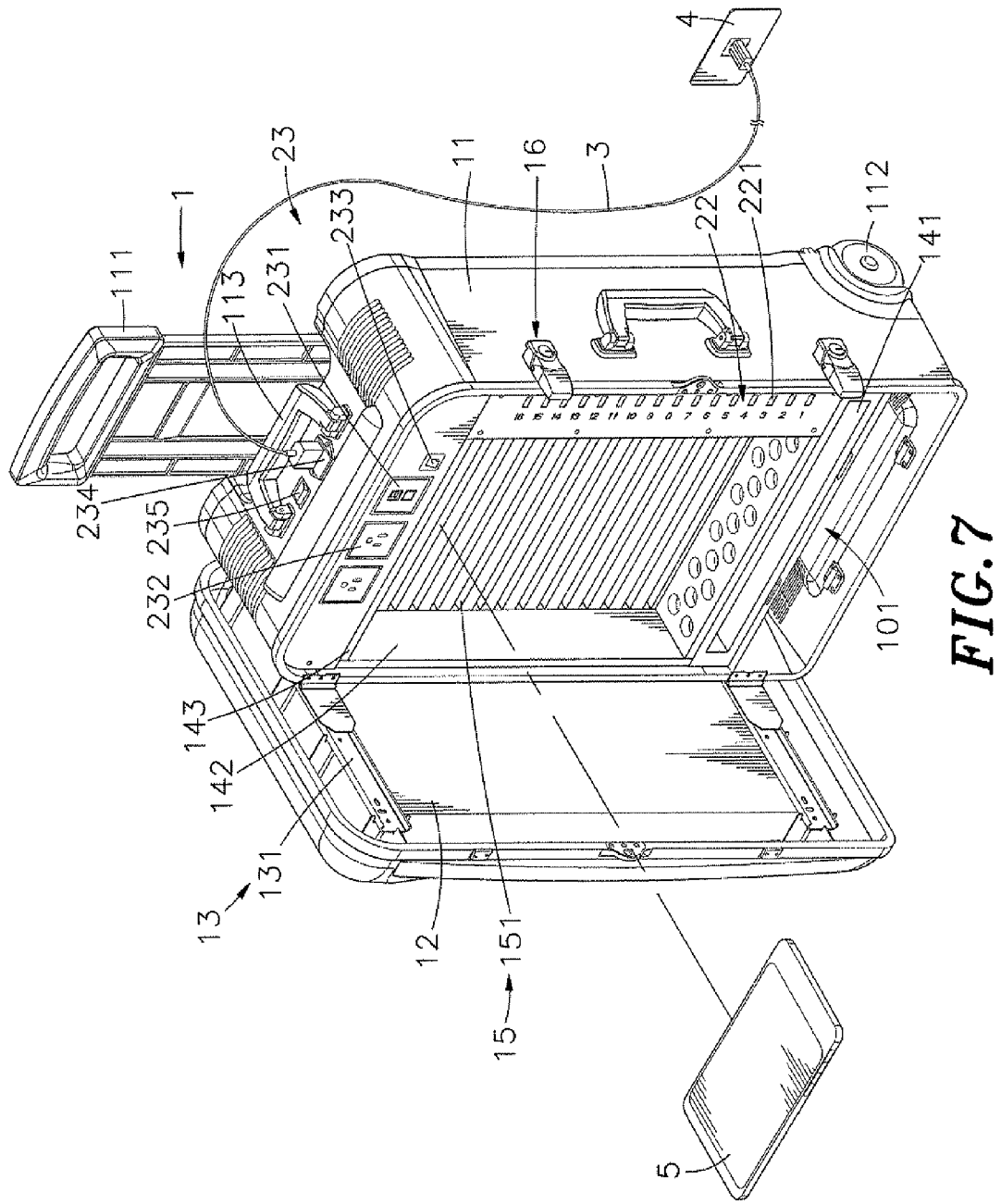
FIG. 7 is a schematic applied view of the present invention, illustrating the power cable connected between the power input connector of the transmission control system to an external AC power source for AC power input.
Figure 8:
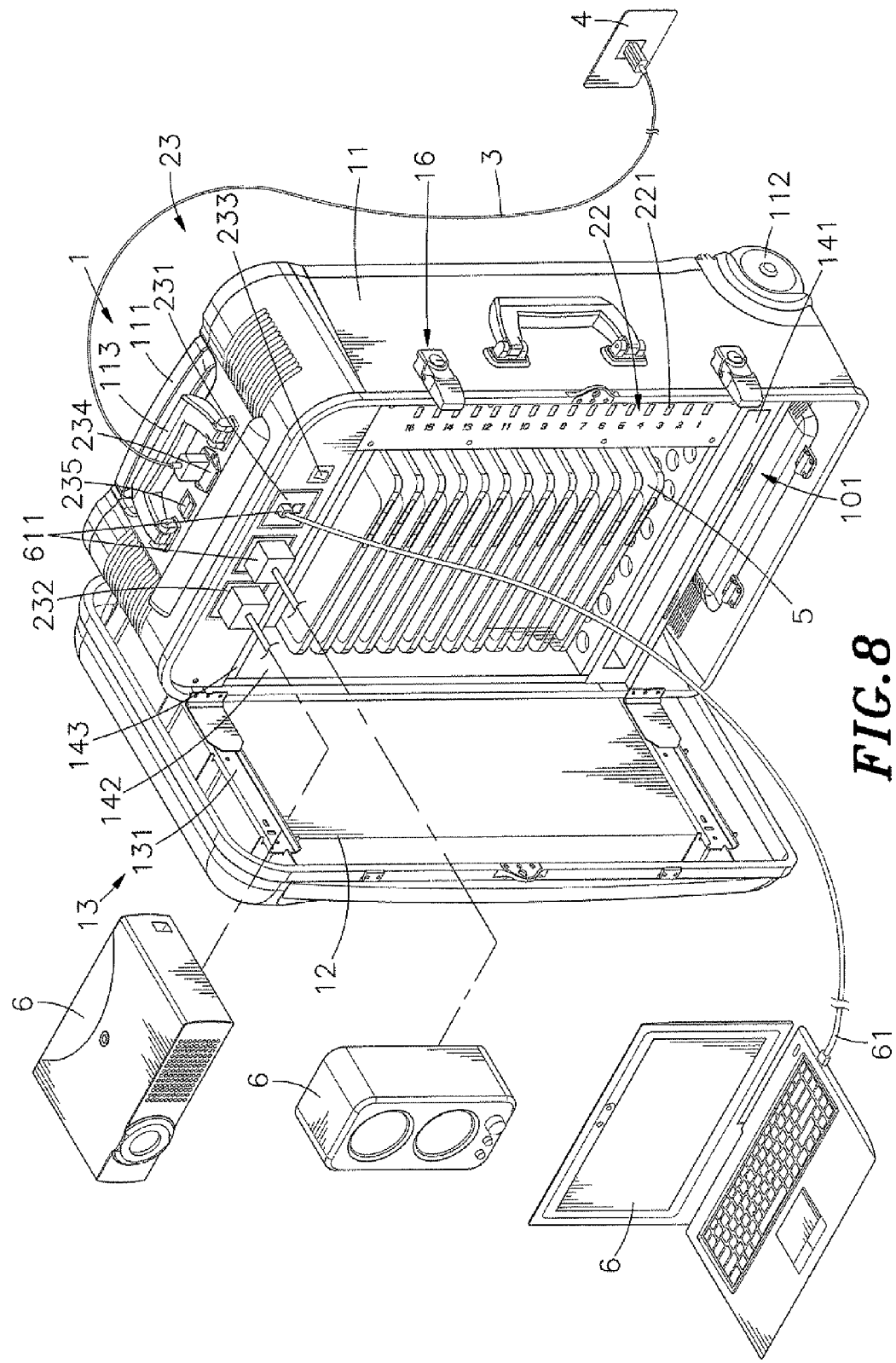
FIG. 8 is another schematic applied view of the present invention, illustrating the power cable connected between the power input connector of the transmission control system to an external AC power source for AC power input and external electrical and electronic devices electrically connected to the signal connector and expansion power sockets of the expansion connector module.

Referring to FIGS. 5-8, by means of one of carrying handles 113, the user can lift the mobile electronic device storage and charging system from the floor by hand and then carry it to another place. Alternatively, the user can carry the retractable handle 111 with the hand to move the mobile electronic device storage and charging system on the floor in a tilted manner for a long distance with less effort.

When using the mobile electronic device storage and charging system, unlock the locks 16, and then turn the cover shell 12 outwardly relative to the hollow base frame shell 11 through 90° angle (i.e., opening the hinge 133 to 90° angle), and then move the cover shell 12 with the first sliding rail 131 along the second sliding rail 132 to one lateral side of the hollow base frame shell 11, facilitating access to the transverse accommodation slots 151 of the organizer 15. At this time, the user can put mobile electronic devices 5 (notebook computers, tablet personal computers, and etc.) into the transverse accommodation slots 151 of the organizer 15, or take the storage mobile electronic devices 5 out of the transverse accommodation slots 151 of the organizer 15. As the cover shell 12 is kept at one lateral side at 90° angle relative to the hollow base frame shell 11 when fully opened, the mobile electronic device storage and charging system will not fall to the floor due to an unstable position of the center of gravity.

Further, the organizer 15 is made of a shock-absorbing material (foam plastics, rubber, etc.), capable of protecting storage mobile electronic devices 5 from shocks. After insertion of mobile electronic devices 5 into the transverse accommodation slots 151 of the organizer 15, connect the electric connectors at respective outer ends of the aforesaid transmission cables to respective ports of the storage mobile electronic devices 5. Thus, the storage mobile electronic devices 5 are electrically connected to the connector module 22 by the respective transmission cables. Thereafter, close the cover shell 12 and lock the locks 16.

After mobile electronic devices 5 are stored in the transverse accommodation slots 151 of the organizer 15 and the locks 16 are locked, the power management unit 21 of the transmission control system 2 can control the connector module 22 to charge the storage mobile electronic devices 5. After charging, the power management unit 21 of the transmission control system 2 can control the connector module 22 to switch off the transmission cables, stopping the supply of power supply. Further, the power management unit 21 performs charging again subject to predetermined charging settings when started again after power off.

Further, the expansion connector module 23 of the transmission control system 2 is mounted on the top panel 143 of the rack 14, and the power input connector 234 and second power switch 235 of the expansion connector module 23 are exposed to the outside of the top wall of the hollow base frame shell 11 of the housing 1. This expansion connector module mounting method is simply an example but not a limitation. In actual application, the expansion connector module 23 can be mounted on the rack 14 at any desired location. Thus, an electric plug 611 of a cable 61 of an external electrical or electronic device 6 can be electrically connected to one signal connector 231 or expansion power socket 232 of the expansion connector module 23 for the transmission of power supply or data signal. The external electrical or electronic device 6 can be a network device (router, hub, etc.), wireless signal transmitter and receiver device (access point, wireless access point, etc.), notebook computer, projector, speaker, printer, or any of a variety of other computer peripheral devices. Thus, a user can send a wakeup signal through an external network to wake up one assigned storage mobile electronic device 5 via a virtual server, and then control the assigned storage mobile electronic device 5 to download educational software or multimedia teaching materials, or to update existing software. When waking up one assigned storage mobile electronic device 5, the transmission control system 2 provides the necessary working voltage. Thus, a user can operate any of the storage mobile electronic devices 5 freely over time and space constraints without repeatedly moving the storage mobile electronic devices 5 in and out of the transverse accommodation slots 151 of the organizer 15. Thus, the invention facilitates management of mobile electronic devices 5 and updating educational materials and other related software.

Further, when going to do an on-line teaching or meeting, take the mobile electronic devices 5 out of the transverse accommodation slots 151 of the organizer 15 and then turn on the mobile electronic devices 5, enabling the mobile electronic devices 5 to be linked to the Internet through an external electronic device 6 (wireless signal transmitter and receiver device, or device having wireless signal transmitting and receiving functions). Thus, multiple people can participate the on-line teaching or meeting, and the mobile electronic devices 5 can work as interactive whiteboards (IWBs). During the learning course, the mobile electronic devices 5 can be controlled to update existing software, ensuring content consistency.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A mobile electronic device storage and charging system, comprising:
   a housing comprising a hollow base frame shell defining therein a forward-facing accommodation chamber for accommodating mobile electronic devices, a retractable handle mounted at a back side of said hollow base frame shell, a plurality of swivel casters pivotally connected to a bottom side of said hollow base frame shell, a cover shell for covering said hollow base frame shell to close said forward-facing accommodation chamber, a plurality of sliding rail assemblies coupled between said hollow base frame shell and said cover shell at different elevations, each said sliding rail assembly comprising a first sliding rail transversely affixed to an inner side of said cover shell, a second sliding rail slidably coupled to said first sliding rail, and a hinge connected between said first sliding rail and said second sliding rail;
   a transmission control system accommodated in said accommodation chamber of said housing, said transmission control system comprising a power management unit, and at least one connector module electrically connected to said power management unit and controllable by said power management unit to charge mobile electronic devices; and
   a power cable adapted for electrically connecting said power management unit to an external power source for power input and for enabling said at least one connector module to charge mobile electronic devices being stored in said forward-facing accommodation chamber subject to the control of said power management unit.

2. The mobile electronic device storage and charging system as claimed in claim 1, wherein said housing further comprises a plurality of carrying handles respectively mounted at top and lateral sides of said hollow base frame shell.

3. The mobile electronic device storage and charging system as claimed in claim 1, wherein said housing further comprises lock means adapted for locking said cover shell to said hollow base frame shell.

4. The mobile electronic device storage and charging system as claimed in claim 1, wherein said housing further comprises a rack mounted in said forward-facing accommodation chamber and an organizer mounted in said rack for accommodating mobile electronic devices, said rack comprising a bottom panel, two upright side panels bilaterally upwardly extended from said bottom panel, a top panel connected between top ends of said upright side panels, a back panel, and a holder chamber surrounded by said bottom panel, said upright side panels, said top panel and said back panel for accommodating said organizer.

5. The mobile electronic device storage and charging system as claimed in claim 4, wherein said organizer comprises a plurality of transverse accommodation slots arranged at different elevations for accommodating mobile electronic devices, and a plurality of wire grooves arranged at different elevations corresponding to said transverse accommodation slots for keeping cables.

6. The mobile electronic device storage and charging system as claimed in claim 1, wherein said connector module comprises a plurality of USB female connectors electrically connectable to storage mobile electronic devices in said accommodation chamber by respective transmission cables for the transmission of power supply and data signals.

7. The mobile electronic device storage and charging system as claimed in claim I, wherein said power management unit of said transmission control system further comprises an expansion connector module electrically connected to said power management unit and said connector module, said expansion connector module comprising at least one signal connector electrically connectable to an external electronic device for power output to the external electronic device and data signal transmission between the external electronic device and the mobile electronic devices being stored in said accommodation chamber, and at least one expansion power socket for power output.

8. The mobile electronic device storage and charging system as claimed in claim 7, wherein said expansion connector module further comprises a power input connector for AC input, and a power switch for switching on/off said power input connector.

* * * * *